(12) United States Patent
Makaremi

(10) Patent No.: US 8,757,003 B1
(45) Date of Patent: Jun. 24, 2014

(54) MULTI-FREQUENCY-BAND BLADE CONDITION MONITORING SYSTEM

(71) Applicant: Shaw Shahriar Makaremi, Goleta, CA (US)

(72) Inventor: Shaw Shahriar Makaremi, Goleta, CA (US)

( * ) Notice: Subject to any disclaimer, the term of this patent is extended or adjusted under 35 U.S.C. 154(b) by 0 days.

(21) Appl. No.: 13/941,244

(22) Filed: Jul. 12, 2013

Related U.S. Application Data (63) Continuation-in-part of application No. 13/326,856, filed on Dec. 15, 2011, now Pat. No. 8,511,177.

(51) Int. Cl.
*G01N 3/22* (2006.01)

(52) U.S. Cl.
USPC ............................................................ 73/847

(58) Field of Classification Search
USPC ............................................................ 73/847
See application file for complete search history.

(56) References Cited

U.S. PATENT DOCUMENTS

| | | | |
|---|---|---|---|
| 3,151,226 A | 9/1964 | Jones et al. | |
| 3,660,789 A | 5/1972 | Weisenburger | |
| 6,771,063 B2 | 8/2004 | Stolfus | |
| 7,086,834 B2 * | 8/2006 | LeMieux | 416/1 |
| 7,348,683 B2 | 3/2008 | Riesberg | |
| 7,600,577 B2 | 10/2009 | Simm et al. | |
| 7,710,107 B2 | 5/2010 | Cochran | |
| 7,954,372 B2 | 6/2011 | Brath et al. | |
| 7,993,098 B2 | 8/2011 | Zhou et al. | |
| 8,170,810 B2 | 5/2012 | Volkmer | |
| 8,222,757 B2 | 7/2012 | Schulten | |
| 8,463,085 B2 * | 6/2013 | Cribbs | 385/13 |
| 2009/0232635 A1 | 9/2009 | Menke | |
| 2009/0277266 A1 * | 11/2009 | Wang et al. | 73/514.01 |
| 2010/0256874 A1 | 10/2010 | Carresjo et al. | |
| 2011/0135469 A1 | 6/2011 | Scholte-Wassink | |
| 2011/0150647 A1 | 6/2011 | Gierlich et al. | |
| 2011/0158806 A1 | 6/2011 | Arms et al. | |
| 2012/0011917 A1 | 1/2012 | Verbruggen | |
| 2012/0025528 A1 | 2/2012 | Sipila et al. | |
| 2012/0035865 A1 | 2/2012 | Fujioka et al. | |
| 2012/0063895 A1 | 3/2012 | Arocena de la Rua et al. | |

OTHER PUBLICATIONS

Electro-Sensors, Inc., spec. sheet for Magnetoresistive Sensors, Models 1102, 932, and 933XP (2012, rev. A).

* cited by examiner

*Primary Examiner* — Lisa Caputo
*Assistant Examiner* — Octavia Davis-Hollington
(74) *Attorney, Agent, or Firm* — Jonathan Small (57) ABSTRACT

A system and method are provided for monitoring the structural integrity of one or more blades in a blade-based device, such as a wind turbine. Multiple frequency bands may be separately analyzed to determined blade condition. Physical and electrical (e.g., lightening) sources of damage, wear and the like are considered. Condition monitoring and alarms may be provided for alerting a user when blade operating condition is determined to be outside of a desired range of blade operation parameters. Timely and cost-effective repair of any structural or weather-related damage or other issues may be provided, thereby improving operating efficiency and safety of blade-based devices.

22 Claims, 5 Drawing Sheets

MULTI-FREQUENCY-BAND BLADE CONDITION MONITORING SYSTEM

CROSS-REFERENCE TO RELATED APPLICATIONS

The present application is a continuation-in-part of copending U.S. application for Letters Patent titled "Blade Condition Monitoring System", Ser. No. 13/326,856, filed on Dec. 15, 2011, which, in its entirety, is hereby incorporated herein by reference and to which priority is claimed.

BACKGROUND

The disclosure is directed to rotating structures where monitoring the structure status can improve reliability and reduce down-time and maintenance cost. The disclosure is directed particularly to structures that generate energy from the flow of gases or liquids, such as wind turbines. The disclosed technology can be applied to other rotating members that may need to be monitored such as aircraft propeller blades and turbine fan blades, or centrifuge arms. The disclosed technology can also be applied to non-rotating structures or bodies under stress or load such as a tall building or the mast of a boat.

Wind turbines form an important part of a balanced energy strategy. Many wind turbine blades are made by hand out of fiberglass. If not properly manufactured, after few months of operation they may begin to develop cracks at weak spots in the blade. These cracks are initially small, and if detected can be repaired on site with little cost, with the blade still mounted on the turbine. If the crack is not repaired promptly, the crack becomes larger until the blade ultimately fails (e.g., breaks). Once a blade fails, the turbine must be taken out of service, until a new blade can be transported to the site and installed, which is very expensive. Prompt detection of turbine blade cracks is therefore important for economical operation of wind turbine energy facilities.

Blade balance is also very important when operating wind turbines. Typically on each turbine there are multiple (e.g., three) blades, which should be balanced prior to installation to prevent any excessive unwanted loads or forces on the main shaft and the gearbox. Damage to the gearbox due to blade imbalance is gradual and will result in excessive gearbox wear within a few months of operation. Wind turbulence and turbine yaw also will have an adverse effect on the gearbox. Blade imbalance can also occur due to local weather conditions, for example due to imbalanced ice or snow accumulation on one or more blades. As turbine down time and gearbox repair is very expensive, early detection of blade imbalance and the application of corrective action to balance the blades are important to prevent problems with the wind turbine.

Lightning strikes also form a hazard for wind turbine blades, and detection of lightning strikes also allows for more efficient and cost-effective turbine blade maintenance. Shock to turbine blades, for example from striking an errant bird, wind-borne debris, and so on are also a risk.

Early identification of risks such as blade imbalance, lightning strikes, and mechanical shocks is crucial to safe, efficient, and cost-effective operation. However, blades rotate around a pivot point, which makes it difficult to provide power to a sensor and receive sensor signals over a wired connection. Effective monitoring of the turbine blades should sense strain on the rotating turbine blades, synchronize measurements with the blade rotation to account for strain effects due to gravitational forces, send data wirelessly to a central location for analysis, and provide a means to remotely power the sensor. Such a monitoring system has not been disclosed in the prior art.

SUMMARY

Accordingly, the present disclosure is directed to systems and methods for addressing the aforementioned shortcomings. One aspect of the present disclosure is directed to monitoring, identifying, and facilitating action to minimize risks associated with latent blade damage. Wind turbine blades may be formed from large pieces of fiberglass, which are expensive to transport and to install due to their large size, and expensive to repair if they break. Stress-induced cracks can form in the turbine blade, which leads over time to extensive blade damage. However, these cracks are relatively inexpensive to repair if caught early and while they are still small.

According to an aspect of the present disclosure, a low cost, real-time blade damage monitoring system and method is disclosed. The system and method can detect problems such as cracks, imbalance, shock, lightning strikes, and so on in or to turbine blades, and allow these problems to be addressed quickly before more extensive damage occurs to the turbine blade. It is essential that the monitoring system be able to detect cracks and excessive blade imbalance before significant damage is done to the turbine system.

According to another aspect of the present disclosure, methods and systems are disclosed for turbine blade characterization. The characterization may be based on one or more of: detecting and measuring blade micro strains, blade torsion, blade shocks, lightning strikes, and blade position.

According to a still further aspect of the present disclosure, blade characterization may be synchronized with blade position to modulate sensor and transmitter power. Increased sensor and transmitter power source lifespan may be provided. Furthermore, each blade in the blade turbine system may be analyzed at the same predetermined target position (e.g., 12-o'clock or top-most vertical position) and variations from blade-to-blade analyzed to determine individual blade condition. Analysis may separately be made for a low-frequency portion and a high-frequency portion of the strain data.

According to yet another aspect of the present disclosure, an indication of blade operational condition of each blade may be provided, and in particular an indication may be provided when a blade operating condition is determined to be outside of a desired range of blade operation parameters.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

The features and advantages of the present disclosure are described and will be apparent to those skilled in art from the following detailed description taken together with the accompanying figures, in which like reference numerals in the various figures denote like elements. The figures are not to scale.

DETAILED DESCRIPTION

Various embodiments of the present disclosure will now be described in detail with reference to examples thereof. However, such examples are merely illustrative, and should not be read as limiting the scope of the present disclosure, or the embodiments thereof, within the boundaries of the claims appended hereto.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details.

Figure 1:
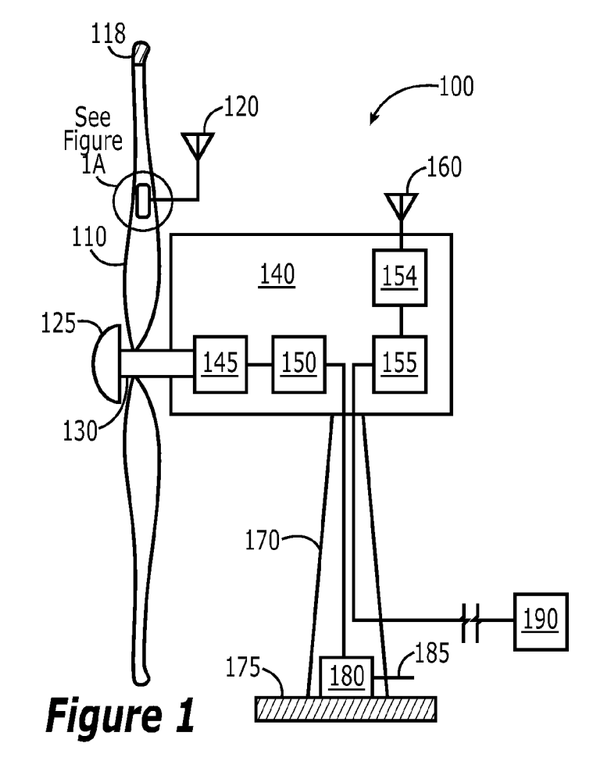
FIG. 1 is an illustration of a wind turbine device and related components in which the systems and methods of the present disclosure may be utilized.

One embodiment of a wind turbine assembly 100 in which the systems and methods of the present disclosure may be utilized is illustrated in FIG. 1. In the exemplary embodiment, two or more wind turbine rotor blades 110 (two blades being shown in FIG. 1) rotate around hub 125 on shaft 130, which is mounted to nacelle 140, which in turn is supported by wind turbine tower 170. Blades 110 are shaped such that the force of the wind causes the blades 110 and shaft 130 to rotate. Shaft 130 drives gearbox 145 and generator 150, producing electrical power. Electrical power is sent down tower 170 in the form of direct current electricity to inverter 180, which converts direct current electricity to alternating current electricity and sends the power to a substation power facility via power lines 185. Tower 170 is mounted to the ground 175, which supports the tower as well as acts as the grounding point for lightning strikes.

Figure 1A:
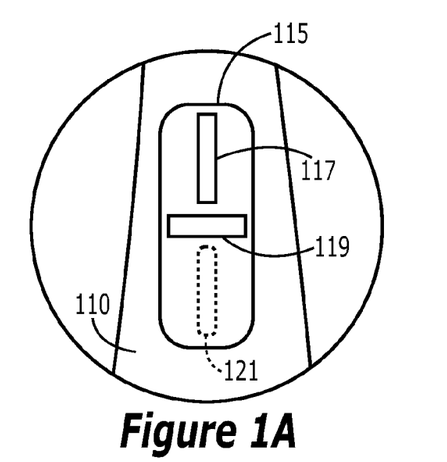
FIG. 1A is a magnified view of a portion of a wind turbine device and related components in which the systems and methods of the present disclosure may be utilized.

With reference also to FIG. 1A, one or more sensor circuits 115 are mounted to each one or more of blades 110, and monitor the status and health of the blades of wind turbine 100. Details of sensor circuit 115 and other elements are shown only in situ for one of the blades 110 in FIG. 1, but it will be understood that each blade 110 may be similarly equipped with sensor circuit 115 and other elements disclosed herein. In the exemplary embodiment, sensor circuit 115 includes a thin piezo-electric film sensor, which measures micro strains and torsional strain, which are the strain resulting from bending and twisting force applied to blades 110. This piezo-electric film is very flat, and measures micro strains when it bends, and measures torsion when it twists.

Each sensor circuit 115 is coupled to a transmitter for wirelessly transmitting sensed strain data to a processing unit for determining blade condition. According to one embodiment of the present disclosure, sensor circuits 115 transmit sensor data using a wireless link (e.g., radio-frequency, Bluetooth, etc.) via antennae 120, 160, and receiver 154 to turbine control unit 155 located in nacelle 140 for analysis. The elements comprising sensor circuit 115 are further discussed below with reference to FIG. 4.

Typical applications will provide between one and three sensor circuits 115 per turbine blade 110. A larger number of sensors per blade provide more comprehensive strain data for analysis, while a smaller number of sensors minimize the cost of the monitoring system.

According to another embodiment of the present disclosure, sensor circuit 115 is connected to an electrical power generator to enable the measurement and transmission of sensor data. Alternatively, each sensor circuit 115 may be connected to a replaceable power source in other embodiments, or sensor power may be provided from nacelle 140.

In certain embodiments, sensor circuit 115 comprises two three-dimensional accelerometers 117, 119 orthogonally secured to each blade to detect blade position. There are two advantages: first, any position on the 360 degree rotation of the blade can be detected by measuring the peak acceleration at that particular location; second, there are no mechanical parts involved and therefore there will be no wear and tear and the life expectancy is greatly enhanced. An example of a structure useful for this position sensing is a multi-axis accelerometer such as the MPU-6050 six-axis accelerometer available from InvenSense, Sunnyvale, Calif. (www.invensense.com).

Turbine blades 110 have conductive end caps 118 at their outermost ends, connected to a lightning rod that in turn is connected to ground to minimize the damage to the blade from a lightning strike, as is known in the existing art.

Turbine control unit 155 housed inside nacelle 140 uses antenna 160 and receiver 154 to receive information about each blade 110 from its attached blade sensor circuit 115. In the preferred embodiment, receiver 154 is a commercial component such as the RX-RM-AUDIO superheterodyne receiver module from ABACOM Technologies (Ontario, Canada).

Information received by turbine control unit 155 includes the analog voltage corresponding to the micro strains and torsion measured on each blade 110 by the attached sensor 115, and the position of the blade 110 where the data was taken. This information is used to analyze the condition of each turbine rotor blade 110. The strain data from blade 110 is converted to a frequency domain representation, for example by Fast Fourier Transform (FFT), and is sent, again for example, according to a known internet protocol (IP) address via a standard TCP/IP data format to central computer 190 for analysis, along with other analog signals from accelerometers and other data collection devices connected on the gearbox and the generator, such as by separate or combined processing sub-systems for synchronizing the collection of strain data with blade position and for analyzing blade operational condition of each blade at various frequency portions of the data. In an alternate embodiment, data from sensor circuits 115 are analyzed by the turbine control unit, and alarm data sent to central computer 190 when measured data from sensor circuits 115 exceed parameters expected for safe operation.

Central computer 190 analyzes the frequency-domain Fourier-transform representation of the strain spectrum from sensor 115. This spectral analysis allows static strain effects that have a low-frequency component to be distinguished from high-frequency energy resulting from environmental and other external source such as the thunder following a lightning strike. The collected data can be averaged over many rotations of the blade 110 to filter out transient noise signals such as wind noise or blade vibration.

The measurement and analysis of micro stain and torsions may be split into two separate frequency ranges. For example, measurements may be made in a low frequency range up to 20 Hz (such as 0.1 Hz to 20 Hz) as well as in a higher frequency range above of 20 Hz (such as 20 Hz to 6 kHz). Of course, other frequency ranges are contemplated hereby, as well as dividing analysis into more than two separate frequency ranges. The above is merely provided as an example of the broader concepts disclosed herein. Different sensor types, sensor performance, sensor positions, signal transmission, signal processing, signal analysis etc. may be implemented to target the different frequency ranges.

Not all sensors, amplifiers, transmitters, receivers, signal processors, etc. work in all frequency ranges, especially for signals of low frequency. Therefore, we separate the data collection and analysis into at least two separate systems, and their associated methods, to detect, transmit, receive, and process the signals by systems and methods optimized for their particular frequencies. For example, in one embodiment, at low frequencies such as at or below 20 Hz, the signals are sampled according to Nyquest-Shannon sampling theorem, and then converted to binary and transmitted digitally. For higher frequencies such as above 20 Hz frequency or amplitude modulation may be utilized.

Figure 9:
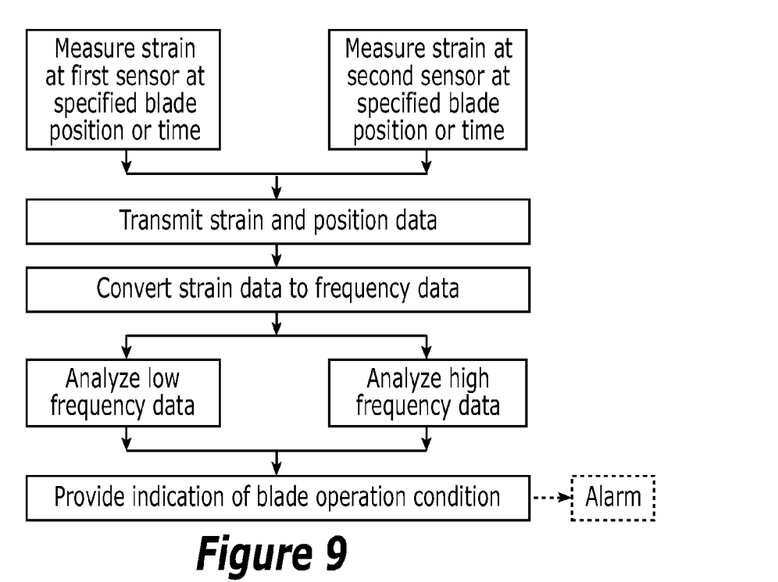
FIG. 9 is a flow chart illustrating a method for multi-frequency-band blade condition monitoring according to an embodiment of the present disclosure.

The dual frequency measurement provides access to certain types of signals that indicate certain types of effects and behaviors. For example, certain low frequency signals may indicate impact with blade, such as by a bird or animal, effects tied to rotation of the blade, such as an out-of-balance blade, and so on. Sounds at higher frequencies may similarly signal other specific effects or behaviors such as blade cracking, lose bolts, fixture cracking, something loose inside the blade. The detection of thunder at a relatively high frequency (e.g., between 20-120 Hz) can suggest the risk or likelihood of a lightning strike. Indeed, though empirical studies, modeling, and so on, it is possible to create a frequency signature table enabling the identification of an effect or behavior of a blade system from the frequency analysis. FIG. 9 is a flow chart illustrating aspects of the method for blade condition monitoring according to an embodiment disclosed above and herein.

To simplify measurements and understand the conditions of measurement, it is best to take the measurements under certain specified conditions. In one embodiment, the conditions are defined for the blade position to be pointing upward (0 deg angle) and pointing downward (180 degree angle). In a three-blade system under normal conditions, the three identical, healthy and balance blades 110 rotate at about 8 to 15 revolutions per minute, so the time of measurement between each blade is less than a second.

According to one technique disclosed herein, analysis is done by comparing the measurements of all blades across one complete revolution of the turbine. If the all blades, blade mounts, etc., are mechanically sound and the blades well balanced, each blade should present an identical frequency signature. A latent issue associated with one blade will display itself through a difference when comparing its measurements to those of the other two blades. That is, if the blades are identical, their micro strain measurements and corresponding Fourier transforms of this data will be very similar. If one blade is damaged, it will display a difference compared to the other blade(s). In such a case, an alarm may be triggered for example at central computer 190 (e.g., indicating which blade, which turbine, and even which wind farm).

Figure 2:
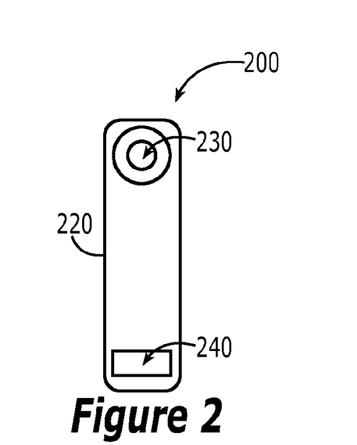
FIG. 2 is an illustration of a blade position sensor for synchronizing data collection with turbine blade position according to an embodiment of the present disclosure.

According to one embodiment of the present disclosure, the position detection is done by proximity condition of a reed relay and a magnet. With reference to FIG. 2, when magnet 240 passes by the reed relay (not shown), it energizes the relay and contacts are closed to command the measurements. The relay rotates with the blade. The magnet 240 is attached to one end of a bar 220. A bearing 230 is secured to bar 220 opposite magnet 240. The bar and the ball bearing act like a pendulum or plumb bob and magnet 240 always points downward (due to gravity) as the blade rotates.

Figure 3A:
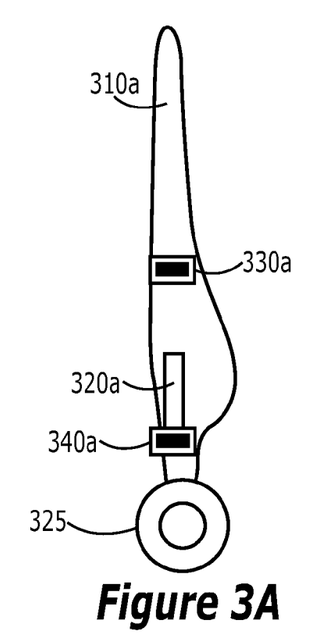
FIGS. 3A and 3B are illustrations of operation of the blade position sensor in two distinct turbine blade positions, respectively, according to an embodiment of the present disclosure.
Figure 3B:
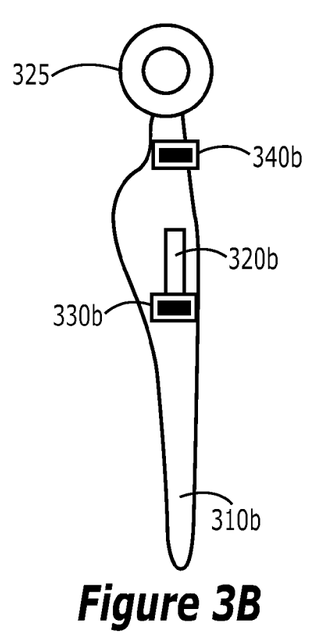

FIGS. 3A and 3B show two positions, respectively, of two turbine blades 310a, 310b. Blade 310a is shown in the straight up (0 deg) position, and blade 310b in the straight down (180 deg) position. While shown separately, each of blades 310a, 310b rotate around hub 325. Blade position detector 320a is shown in association with blade 310a in the straight up position and blade position detector 320b is shown in association with blade 310b in the straight down position, but again in practice these are the same, single blade position detector 320.

With blade 310a in the straight up position, the magnet of blade position detector 320a overlaps with sensor 340a but not sensor 330a, signaling turbine control unit 115 that blade 110 is straight up. Conversely, with blade 310b in the straight down position, the magnet of blade position detector 320b overlaps with sensor 330b but not sensor 340b, signaling turbine control unit 155 that blade 110 is straight down. Sensors 340a and 330b are used to trigger data acquisition of sensor circuit 115 (FIG. 1), and to power down sensor circuit 115 after data acquisition. While a gravity and magnet system has been described above for blade position determination, many other methods of sensing orientation, such as optical sensors, and the like, are also contemplated hereby.

Figure 4:
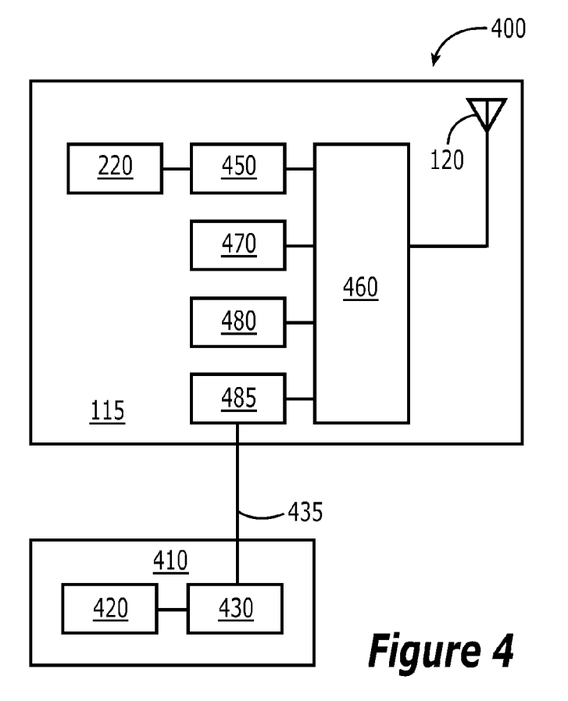
FIG. 4 is a block diagram of a blade sensor system according to an embodiment of the present disclosure.

FIG. 4 shows a block diagram of a blade sensor system 400 according to one embodiment of the present disclosure, which includes sensor circuit 115 and autonomous power supply 410. In a preferred embodiment, blade sensor 480 is part number DT4-028 K from Measurement Specialties (www.meas-spec.com), a 0.86"×6.72" strain sensor that is 40 micro meter thick.

According to an embodiment of the present disclosure, autonomous power supply 410 supplies power locally to sensor circuit 115, and is comprised of power generator 420 and power regulator 430, with power output 435. The rotation of blade 110 (FIG. 1) will cause the movement of a magnet inside a coil and thus generates power from output 435 to the rest of blade sensor circuit 115, as discussed further below.

Blade position detector 220 detects the position of the rotating turbine blades in the vertically up (zero degrees) and vertically down (180 degrees) position.

Adjustable timer 450 sets the measurement interval following a trigger signal from blade position detector 220. When a blade 110 is in the vertically up or vertically down position it will trigger timer 450 to turn transmitter 460 on for a certain duration of time. This duration of time is important for calculation of number of samples and maximum frequency of the signal for the FFT transformation into frequency domain.

Multiple blade sensor circuits 115 transmit status information to turbine control unit 155. To identify which blade is sending the information, blade designator 470 provides a unique digital signature enabling turbine control unit 155 to determine the source of each signal. An oscillator at a known frequency representing the number of the blade sensor circuit 115 (e.g., blade 1→1 KHz, blade 2→2 KHz, etc.) is connected to the transmitter 460 for identification of signals from each sensor circuit 115.

Piezo-electric sensor 480 converts the micro strain and torsional strain into voltage and supplies the strain data to transmitter 460, which sends the data via antenna 120 to turbine control unit 155. Since sensors 470 are close to one another, in the case of independent blade pitch control, multiple strain sensors 480 can be connected to one transmitter and power supply. Alternately, piezo-electric strain sensor 480 may be replaced or augmented with a Bragg grating or other fiber optic sensor, strain gauge sensor, accelerometer, velocity sensor, velometer and proximity probes or other known means of sensing physical integrity of the blade.

Figure 8:
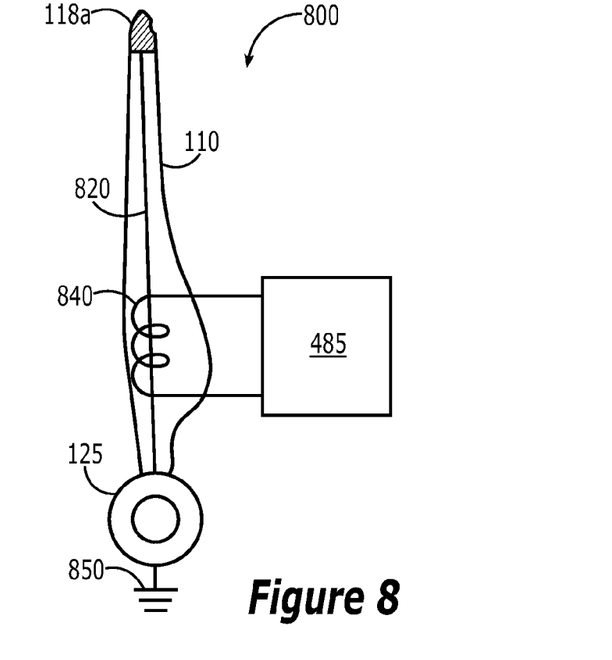
FIG. 8 is a schematic diagram illustrating the operation of lightning suppression and lightning detection according to an embodiment of the present disclosure.

Lightning sensor 485 senses current flow from conductive end cap 118 which results from a lightning strike to blade 110 through conductive rod 820 (shown in FIG. 8).

In the exemplary embodiment, transmitter 460 is a TX-FM-RADIO commercial integrated circuit by ABACOM Technologies (Ontario, Canada). In the exemplary embodiment transmitter antenna 120 is a helical antenna consisting of enameled copper wire with a diameter of 0.5 mm closely wound on a 3.2 mm diameter form. Transmitter antenna 120 is implemented with 26 turns of wire if transmitting at a center frequency of 418 MHz center frequency, or 24 turns of wire if transmitting at a center frequency of 433 MHz. Alternately, transmitter 460 may be implemented using an infrared optical source or other known means of data transmission. Communication from blade sensor 115 to turbine control unit 115 may or may not be limited to wireless, hard wired, Ethernet, or other known communication means. The sensor signal could be routed from blade 110 through a slip ring to nacelle 140, or use other known signal routing means.

Figure 5:
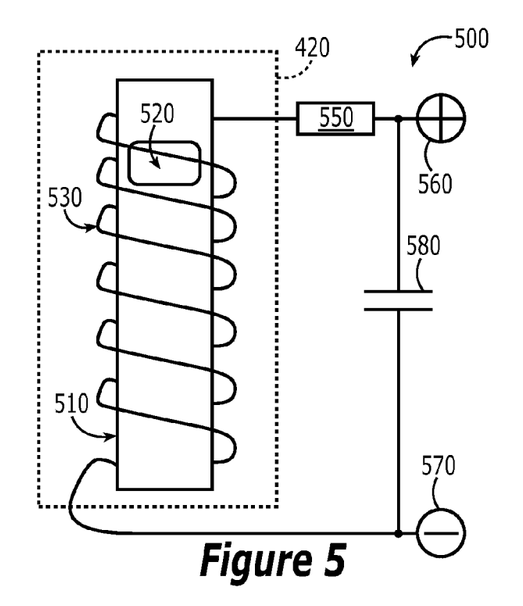
FIG. 5 is a schematic diagram of a power generator used to power a blade sensor according to an embodiment of the present disclosure.

Details of power generator 420 are shown in FIG. 5. Power generator 420 is made of a plastic tube 510 about 15 cm long with a permanent magnet 520 that can easily slide up and down inside the tube. The outside of the tube 510 is a wire coil 530 wound with many turns of small gauge wire. This tube 510 is installed tangential to the direction of the rotation of blade 110.

The size and weight of the various components of power generator 420 are selected such that as blade 110 rotates, permanent magnet 520 moves up and down in the tube 510 by the pull of gravity (overcoming centrifugal force from the blade rotation). This up and down motion of magnet 520 within coil 530 generates electrical current to supply sensor 115 and to charge capacitor 580 for energy storage. Alternately, power generator 420 may be implemented using motion driven power, battery power, solar power, nuclear power, controller/scada driven power, thermal power, or other known means of power generation. Alternately power may be supplied externally via a hard-wired external power source, for example via nacelle 140. Capacitor 580 may be augmented or replaced with a battery or other known means of power storage.

When the wind turbine is not operating, current sensor 550 will not detect any charging current and will turn off transmitter 460 to preserve energy stored in capacitor 580. This simple, small, and lightweight autonomous and independent power generation inside the blade will supply the transmitter without any need for any other source of power.

Figure 6:
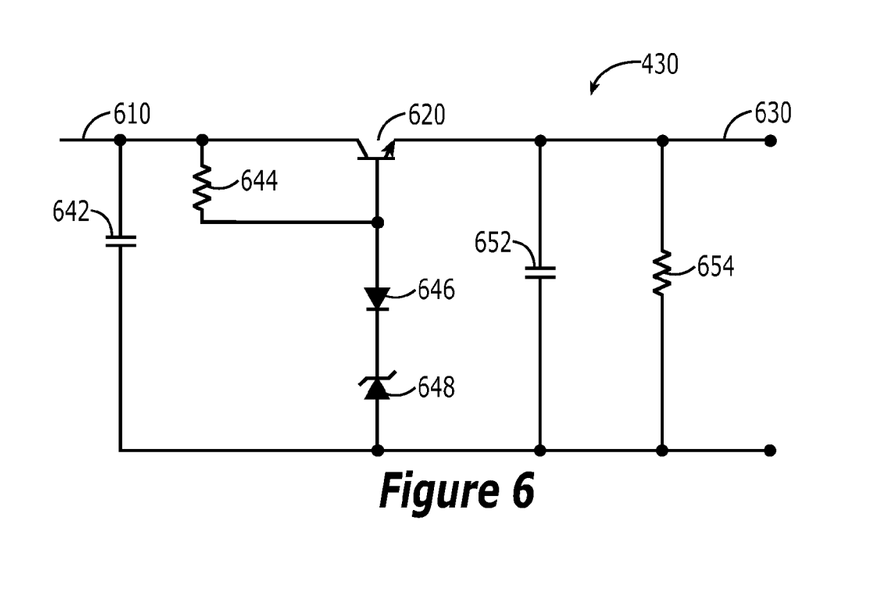
FIG. 6 is a schematic diagram of a regulated power supply which conditions the power received from a power generator according to an embodiment of the present disclosure.

The non-regulated output 560 of power generator 420 is an input 610 to a regulated power supply 430, shown in more detail in FIG. 6. Transistor 620 clamps the output voltage at a fixed value using a bias network comprising two diodes 646 and 648, a resistor 644 and a capacitor 642. The bias current for transistor 620 is provided by output resistor 654, and filtering of output power 630 is provided by capacitor 652. Power regulator 430 also may be implemented with an integrated circuit, or other known method of voltage regulation.

Figure 7:
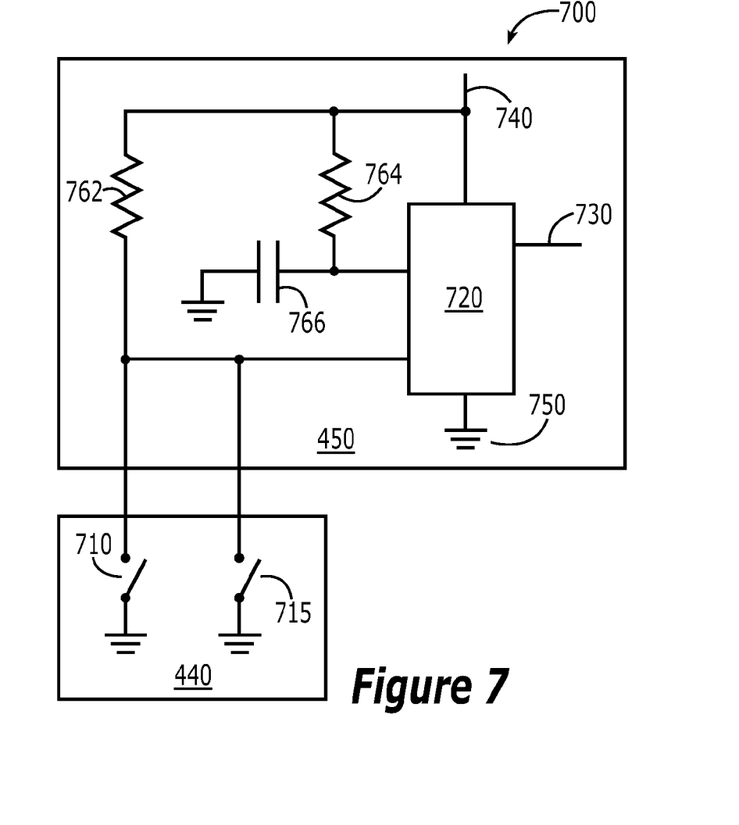
FIG. 7 is a schematic diagram of a combination of blade position detector and timer used to initiate and terminate a strain measurement according to an embodiment of the present disclosure.

The combination of blade position detector 440 and timer 450 are shown in FIG. 7. Blade position detector 440 consists of two switches 710 and 715, each of which is formed by the contacts of a reed relay that temporarily closes once during a full rotation of blade 110. The reed relay was included in the FIG. 2 description, but not shown. Switch 710 is closed when blade 310a is at 0 degree position, and magnet 240 overlaps sensor 340a as shown in FIG. 3. Switch 715 is closed when blade 310b is at 180 degree position, and magnet 240 overlaps sensor 330b as shown in FIG. 3.

Each time blade detection switch 710 or 715 closes, it triggers timer 720 constructed using an LM555 integrated circuit (or similar), which generates a 500 ms timing pulse at output 730, during which time data is collected from sensor 115. Timer 720 has a power source 740 and pull-up resistor 762 for bias, and a combination of resistor 764 and capacitor 766 that sets the duration of the timing pulse. Timer 720 is also connected to power voltage 740 and ground 750. Alternately, blade position detector 440 may be implemented using a shaft encoder, tachometer, or other known means of rotation measurement. A trigger may or may not be used to activate measurements for the purpose of comparable phasing and possibly pitch. This trigger may be laser, optic, magnetic, electronic, or scada based.

The lightning protection operation of conductive end cap 118 and lightning sensor 485 is further illustrated in FIG. 8. Under ideal circumstances, a lightning strike to blade 110 will occur at conductive end cap 118. The lightning strike produces electrical current, which flows down rod 820 through the center of blade 110, to hub 125 to ground 850. As a result of the current through rod 820, an electrical voltage is produced in coil 840, which is wrapped around rod 820. This resulting voltage is sensed by lightning sensor 485, and a signal is sent to central computer 190 that a lightning strike occurred in blade 110. Data analysis is performed, and a repair operator is notified if a potentially unsafe condition exists.

It will be appreciated that in certain embodiments the sensors and signal processing may be calibrated (or recalibrated) prior to deployment. This calibration may be accomplished by one or more of many techniques, such as generating a test signal on the blade and then comparing the response to a template or known expected response. A sinusoidal function is one such test signal. This signal can be used both for identification of a specific blade and as a calibration signal. The amplitude of the sinusoidal function can easily be adjusted using a potentiometer to indicate a certain acceleration in frequency domain. The adjustment and/or output in response to the sinusoid can then be used in the signal process stage to ensure that the processed sensor data is comparable from blade-to-blade.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way.

Furthermore, various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A system for measuring operating condition of a blade in a multi-blade turbine system, comprising:
   a plurality of rotatable blades;
   a first sensor sub-system, associated with each said blade, for measuring strain on said rotating blade;
   a second sensor sub-system, associated with each said blade, for measuring position of each said rotating blade;
   a wireless data link for transmitting strain data representing the measured strain to a remote location;
   a first processing sub-system for synchronizing the collection of strain data from said first sensor sub-system to blade position as determined by said second sensor sub-system such that said strain data is collected at at least one predetermined target position of said rotating blade;
   a second processing sub-system for analyzing blade operational condition of each said blade, said second processing sub-system configured to:
      convert said strain data to frequency spectrum data;
      separate said frequency spectrum data into a low frequency portion and a high frequency portion; and,
      separately analyze said blade operational condition for each of said low frequency portion and said high frequency portion; and
   an indicator sub-system providing an indication of said blade operating condition of each said blade.

2. The system of claim 1, wherein said indicator sub-system is configured to provide an indication when said blade operating condition is determined to be outside of a desired range of blade operation parameters.

3. The system of claim 2, wherein said indicator sub-system is configured to provide a first indication when said blade operating condition is determined to be outside of a desired range of blade operation parameters based on said analysis of said low frequency portion, and a second indication when said blade operating condition is determined to be outside of a desired range of blade operation parameters based on said analysis of said high frequency portion.

4. The system of claim 1, wherein said indicator sub-system is configured to provide a first indication of said blade operational condition of each said blade based on said analysis of said low frequency portion, and a second indication of said blade operational condition of each said blade based on said analysis of said high frequency portion.

5. The system of claim 1, wherein said low frequency portion extends up to 20 Hz, and said high frequency portion extends above 20 Hz.

6. The system of claim 5, wherein said low frequency portion is within the range 0.1 Hz to 20 Hz and said high frequency portion is within the range 20 Hz to 6 kHz.

7. The system of claim 1, wherein each said first sensor sub-system comprises a low frequency sensor and a separate high frequency sensor.

8. The system of claim 1, wherein said second processing sub-system comprises a filter for separating said low frequency portion and said high frequency portion of said strain data.

9. The system of claim 1, wherein said second processing sub-system is configured to compare said low frequency portion and said high frequency portion for each blade of said multi-blade turbine system as measured at said predetermined target position.

10. The system of claim 9, wherein said second processing sub-system is configured to compare said low frequency portion and said high frequency portion for each blade of said multi-blade turbine system as measured at said predetermined target position across one complete rotation of all blades of said turbine system.

11. The system of claim 1, wherein said first sensor sub-system comprises a strain sensor.

12. The system of claim 11, wherein said first sensor sub-system comprises a torsional strain sensor.

13. A method for measuring operating condition of a blade in a multi-blade turbine system, comprising for each blade:
   measuring strain on a rotating blade by way of a first sensor sub-system associated with said blade;
   measuring position of said rotating blade by way of a second sensor sub-system associated with each said blade;
   transmitting strain data representing the measured strain by way of a wireless data link to a remote location;
   synchronizing the collection of strain data by said first sensor sub-system to blade position as determined by said second sensor sub-system, by way of a first processing sub-system, such that said strain data is collected at at least one predetermined target position of said rotating blade;
   analyzing blade operational condition of said blade by way of a second processing sub-system, said analyzing comprising:
      converting said strain data to frequency spectrum data;
      separating said frequency spectrum data into a low frequency portion and a high frequency portion; and,
      separately analyzing said blade operational condition for each of said low frequency portion and said high frequency portion; and
   providing an indication of said blade operating condition of said blade by way of an indicator sub-system.

14. The method of claim 13, further comprising providing an indication when said blade operating condition is determined to be outside of a desired range of blade operation parameters.

15. The method of claim 14, further comprising providing a first indication when said blade operating condition is determined to be outside of a desired range of blade operation parameters based on said analysis of said low frequency portion, and a second indication when said blade operating condition is determined to be outside of a desired range of blade operation parameters based on said analysis of said high frequency portion.

16. The method of claim 13, further comprising providing a first indication of said blade operational condition of each said blade based on said analysis of said low frequency portion, and a second indication of said blade operational condition of each said blade based on said analysis of said high frequency portion.

17. The method of claim 13, wherein said low frequency portion extends up to 20 Hz, and said high frequency portion extends above 20 Hz.

18. The method of claim 17, wherein said low frequency portion is within the range 0.1 Hz to 20 Hz and said high frequency portion is within the range 20 Hz to 6 kHz.

19. The method of claim 13, further comprising obtaining data for said low frequency portion from a low frequency sensor and obtaining data for said high frequency portion from a separate high frequency sensor.

20. The method of claim 13, further comprising separating, by said second processing sub-system, said low frequency portion and said high frequency portion of said strain data.

21. The method of claim 13, further comprising comparing said low frequency portion and said high frequency portion for each blade of said multi-blade turbine system as measured at said predetermined target position.

22. The method of claim 21, wherein said comparing said low frequency portion and said high frequency portion for each blade of said multi-blade turbine system as measured at said predetermined target position is performed across one complete rotation of all blades of said turbine system.

\* \* \* \* \*